(12) United States Patent
Kannan et al.

(10) Patent No.: US 12,440,590 B2
(45) Date of Patent: Oct. 14, 2025

(54) DISINFECTION CAP

(71) Applicant: Becton, Dickinson and Company, Franklin Lakes, NJ (US)

(72) Inventors: Balaji Kannan, Chennai (IN); Karthik MR, Bangalore (IN); Prasad Govindaraj, Coimbatore (IN); Manish Kumar, Arrah (IN)

(73) Assignee: Becton, Dickinson and Company, Franklin Lakes, NJ (US)

( * ) Notice: Subject to any disclaimer, the term of this patent is extended or adjusted under 35 U.S.C. 154(b) by 850 days.

(21) Appl. No.: 17/697,505

(22) Filed: Mar. 17, 2022

(65) Prior Publication Data

US 2023/0293750 A1    Sep. 21, 2023

(51) Int. Cl.
| | |
|---|---|
| *A61L 2/18* | (2006.01) |
| *A61L 2/26* | (2006.01) |
| *A61M 39/16* | (2006.01) |
| *A61M 39/20* | (2006.01) |
| *A61L 101/32* | (2006.01) |

(52) U.S. Cl.
CPC .................. *A61L 2/18* (2013.01); *A61L 2/26* (2013.01); *A61M 39/162* (2013.01); *A61M 39/20* (2013.01); *A61L 2101/32* (2020.08); *A61L 2202/24* (2013.01)

(58) Field of Classification Search
CPC .......................... A61L 9/00–22; A61L 2/00–28
See application file for complete search history.

(56) References Cited

U.S. PATENT DOCUMENTS

| | | | |
|---|---|---|---|
| 8,641,681 B2 | 2/2014 | Solomon et al. | |
| 10,589,080 B2 | 3/2020 | Hitchcock et al. | |
| 2019/0111245 A1* | 4/2019 | Gardner | A61M 39/20 |
| 2019/0282795 A1* | 9/2019 | Fangrow | A61M 39/162 |
| 2020/0238070 A1* | 7/2020 | Ryan | A01N 47/44 |
| 2021/0008237 A1 | 1/2021 | Okman et al. | |

FOREIGN PATENT DOCUMENTS

| | | | | |
|---|---|---|---|---|
| WO | WO-2019199786 A1 * | 10/2019 | | A61M 39/16 |
| WO | WO-2021067155 A1 * | 4/2021 | | A61F 5/08 |

OTHER PUBLICATIONS

PCT International Search Report and Written Opinion in PCT/US2023/015339 dated Jun. 9, 2023, 12 pages.

* cited by examiner

*Primary Examiner* — Jill A Warden
(74) *Attorney, Agent, or Firm* — Servilla Whitney LLC

(57) ABSTRACT

A disinfection cap for a male medical connector comprising a housing, a scrubbing foam having a plurality of slits disposed within a first cavity of the housing, a central post extending from the closed bottom of the housing and positioned within the first cavity of the housing, a foam jacket disposed on the central post and having a plurality of slits; and a central plug disposed in the center of the central post extending from the top wall of the central post and extending into the second cavity of the foam jacket. The inner surface of the foam jacket defines a second cavity.

20 Claims, 10 Drawing Sheets

DISINFECTION CAP

TECHNICAL FIELD

The present disclosure generally relates to a device for disinfecting and sterilizing access ports and, in particular, to disinfecting and sterilizing devices with male Luer fittings using a combination of mechanical scrubbing action and use of chemical disinfection agents. Generally, embodiments herein relate to the fields of medical caps and medical disinfection caps, and in particular caps and/or disinfection caps for uses with male Luer connectors.

BACKGROUND

Vascular access devices (VAD's) are commonly used therapeutic devices and include intravenous (IV) catheters. There are two general classifications of VAD's: peripheral catheters and central venous catheters. Each access point is associated with some risk of transmitting a catheter related bloodstream infection (CRBSI), which can be costly and potentially lethal. Throughout the sequence of procedures associated with the transmission of a microorganism that can cause a CRBSI, there are many risks of contact or contamination. Contamination can occur during drug mixing, attachment of a cannula, and insertion into the access hub. Unprotected access points of the VAD can touch floors, contaminated body parts, bed linens and other unsterile surfaces adding to their bioburden. Also, they can be contaminated with blood stains, remnant of medication, etc. Because the procedure to connect to a VAD is so common and simple, the risk associated with entry into a patient's vascular system has often been overlooked. Bacteria and other microorganisms may gain entry into a patient's vascular system from access hubs and ports/valves upon connection to the VAD to deliver the fluid or pharmaceutical. Before using these IV access points to connect them to any port (injection ports, catheter ports, etc.), they need to be disinfected.

Studies have found that over 30% of male luers become contaminated during use. In order to decrease CRBSI cases and to ensure VAD's are used and maintained correctly, standards of practice have been developed, which include disinfecting and cleaning procedures.

In developed markets, when utilizing an IV catheter, a needleless connector will typically be used to close off the system and then subsequently accessed to administer medication or other necessary fluids via the catheter to the patient. INS Standards of Practice recommend the use of a needleless connector and state that it should be "consistently and thoroughly disinfected using alcohol, tincture of iodine or chlorhexidine gluconate/alcohol combination prior to each access." The disinfection of the needleless connector is ultimately intended to aid in the reduction of bacteria that could be living on the surface and possibly lead to a variety of catheter related complications including CRBSI. Presently, minimizing the risk CRBSI to patients is a substantial function of the diligence of the clinician performing the connection, and this diligence is largely uncontrollable.

Nurses will typically utilize a 70% isopropyl alcohol (IPA) pad to complete this disinfection task by doing what is known as "scrubbing the hub." However, compliance to this practice is typically very low. In addition to a lack of compliance to "scrubbing the hub", it has also been noted through clinician interviews that there is often a variation in scrub time, dry time and the number of times the needleless connector is scrubbed leading to inconsistent disinfection.

Disinfection caps are included in the Society for Healthcare Epidemiology of America (SHEA) guidelines and early indications are that caps will also be incorporated into the Infusion Nurses Standards (INS) guidelines. Studies have shown that disinfecting compliance of disinfecting vascular access device increases with the use of disinfection caps and that practitioners prefer using disinfection caps over the conventional disinfecting and cleaning procedures.

Currently available disinfection caps only disinfect the outer taper surface of male luer connectors. However, other surfaces primarily the luer threads also need to be cleaned and disinfected prior to use. Currently available disinfecting caps also do not have any design features which can actively clean the contaminated surfaces with scrubbing action. It is highly beneficial to have the internal surfaces, like the thread region, scrubbed and disinfected prior to use. Currently available disinfection caps for male luers lack a scrubbing device, particularly scrubbing devices capable of cleaning both the internal surfaces, like the thread region, along with the outer surfaces of the male luer connector. To increase effectiveness of cleaning and disinfection of male luers, there is a need to incorporate a scrubbing device into disinfection caps for uses with fluid male Luer connectors. When using a disinfection device, disinfectant ingress is a consideration for clinicians because ingress of disinfectant can compromise safety to patients. Disinfectant ingress is to be mitigated to non-toxic levels according to toxicology standards. Thus, there is a need for disinfection caps used with medical connectors such as male connectors on IV tubing end, to minimize ingress of disinfectant, such as isopropyl alcohol or chlorhexidine, into the central lumen of the connectors.

Specifically, there is a need for a disinfection device which disinfects the threaded region of a male luer connector while simultaneously reducing or avoiding ingress of disinfectant fluid into the male lumen.

SUMMARY

Aspects of the disclosure pertain to caps for use with medical connectors.

A first aspect of the present disclosure relates to a cap having a housing, a scrubbing foam, a central post, a foam jacket, a central plug disposed in the central post and a liquid disinfectant or antimicrobial agent, or combinations thereof. The housing having a closed distal end, a distal wall, an open proximal end defining an opening, a sidewall extending from the closed distal end to the open proximal end, and a first cavity configured to receive a hub of a male medical connector. The scrubbing foam disposed within the first cavity. The central post extending from the distal wall of the housing and positioned within the first cavity. The foam jacket disposed on the central post and defining a second cavity. The central plug disposed in the central post and extending into the second cavity of the foam jacket. The central plug is joined to the central post by a ball and socket joint.

In one or more embodiments, upon engagement of the cap with a male medical connector, the scrubbing foam and the foam jacket contacts a thread and an outer surface of the male medical connector.

In one or more embodiments, the central plug enters the lumen to inhibit disinfectant ingress into the lumen.

In one or more embodiments, the scrubbing foam includes an annular wall having a slotted end formed by a plurality of slits and a plurality of prongs.

In one or more embodiments, the foam jacket includes an annular wall having a slotted end formed by a plurality of slits and a plurality of prongs.

In one or more embodiments, the central post includes an annular wall having a slotted end formed by a plurality of slits and a plurality of prongs.

In one or more embodiments, the central plug is disposed in an aperture of the central post and extending into the second cavity of the foam jacket.

In one or more embodiments, the foam jacket contacts a front tip face, outer surface of Luer and internal thread of the male medical connector when the male medical connector enters the first cavity and the second cavity.

In one or more embodiments, the scrubbing foam contacts a front tip face and outer luer surface of the male medical connector when the male medical connector enters the first cavity and second cavity.

In one or more embodiments, an outside geometry of the central plug comprises a frusto-conical tapered surface effective to complement an inner surface of a lumen of the male medical connector.

In one or more embodiments, the housing comprises a polymeric material selected from the group consisting of polyethylene, polypropylene, thermoplastic elastomer (TPE), or combinations thereof.

In one or more embodiments, the male medical connector comprises a male Luer connection.

In one or more embodiments, the liquid disinfectant or the antimicrobial agent may be isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorhexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof. In a specific embodiment, liquid disinfectant or antimicrobial agent comprises at least one of chlorhexidine gluconate and chlorhexidine diacetate.

The liquid disinfectant or antimicrobial agent clings between the plurality of slits and the plurality of prongs.

A second aspect of the present disclosure relates to a method of disinfecting a medical connector including placing a cap of present disclosure onto a male medical connector by contacting a distal tip and threads of the medical connector with the scrubbing foam and the foam jacket and the central plug inhibits disinfectant ingress into a lumen of the male medical connector.

A third aspect of the present disclosure relates to a medical assembly including a cap of present disclosure connected to a medical connector having a male luer connection.

DETAILED DESCRIPTION

Figure 1:
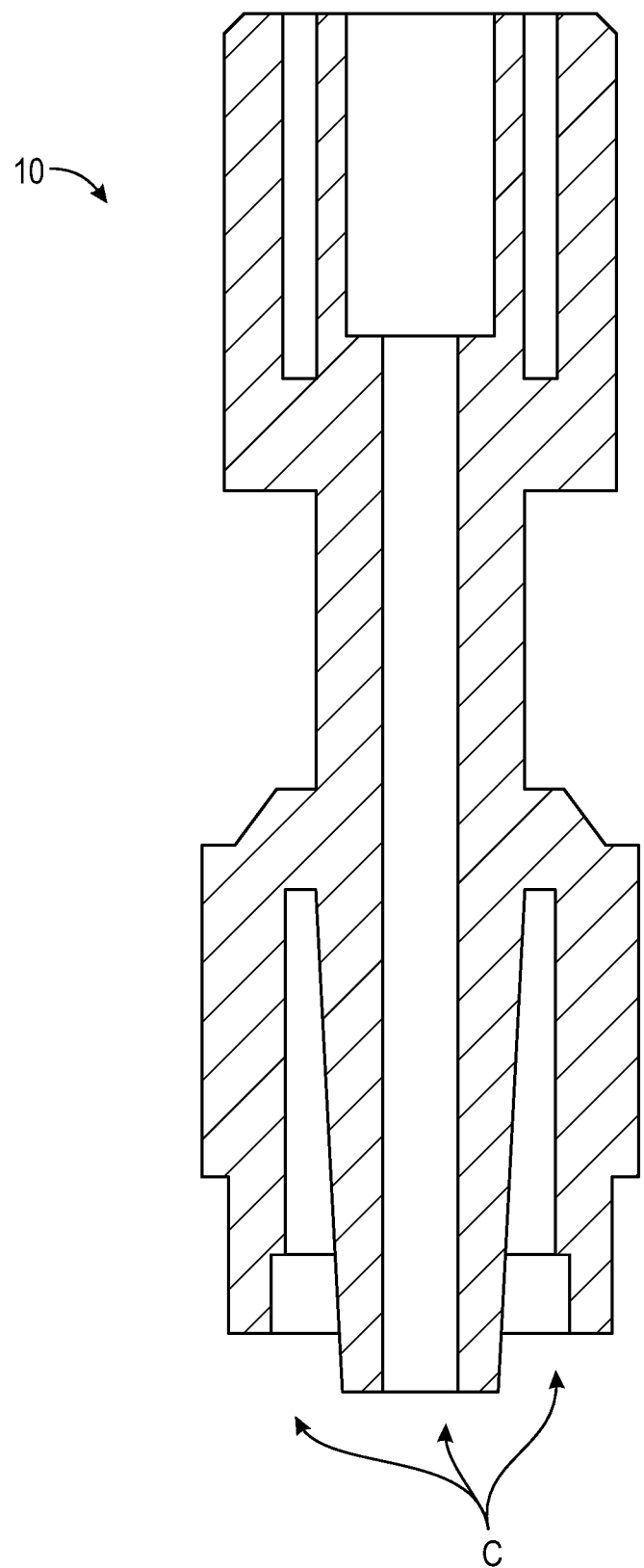
FIG. 1 illustrates a perspective cross-section view of a male medical connector of the prior art illustrating areas of possible contamination.

Embodiments of the present disclosure pertain to a sterile disinfection cap connection to and disinfection of a medical connector, specifically male connectors. The male connectors can be male Luer connectors. Embodiments of the disclosure pertain to male luer disinfection caps which disinfect the threaded surfaces and the exterior surfaces of male luer connectors by a combination of scrubbing and chemical action due to the disinfectant in the cap. Specific embodiments of the present disclosure relate to a scrubbing device containing a liquid disinfectant for use with male connectors capable of providing both passive disinfection by use of a liquid disinfectant and active disinfection by use of a scrubbing motion. The cap of the present disclosure also prevents ingress of the liquid disinfectant into the lumen of the male luer connector.

With respect to terms used in this disclosure, the following definitions are provided.

As used herein, the use of "a," "an," and "the" includes the singular and plural.

As used herein, the term "catheter related bloodstream infection" or "CRBSI" refers to any infection resulting from the presence of a catheter or IV line.

As used herein, the term "Luer connector" refers to a connection collar that is the standard way of attaching syringes, catheters, hubbed needles, IV tubes, etc. to each other. The Luer connector consists of male and female interlocking tubes, slightly tapered to hold together better with even just a simple pressure/twist fit. Luer connectors can optionally include an additional outer rim of threading, allowing them to be more secure. A Luer connector comprises a distal end, a proximal end, an irregularly shaped outer wall, a profiled center passageway for fluid communication from the chamber of the barrel of a syringe to the hub of a vascular access device (VAD). A Luer connector also has a distal end channel that releasably attaches the Luer connector to the hub of a VAD, and a proximal end channel that releasably attaches the Luer connector to the barrel of a syringe.

As would be readily appreciated by skilled artisans in the relevant art, while descriptive terms such as "tip", "hub", "thread", "sponge", "prong", "protrusion", "wall", "top", "side", "bottom" and others are used throughout this specification to facilitate understanding, it is not intended to limit any components that can be used in combinations or individually to implement various aspects of the embodiments of the present disclosure.

The matters exemplified in this description are provided to assist in a comprehensive understanding of exemplary embodiments of the disclosure. Accordingly, those of ordinary skill in the art will recognize that various changes and modifications of the embodiments described herein can be made without departing from the scope and spirit of the disclosure. Also, descriptions of well-known functions and constructions are omitted for clarity and conciseness.

Before describing several exemplary embodiments of the disclosure, it is to be understood that the disclosure is not limited to the details of construction or process steps set forth in the following description. The disclosure is capable of other embodiments and of being practiced or being carried out in various ways.

Referring now to the drawings, wherein like reference numerals designate identical or corresponding parts throughout the several views, embodiments of the present disclosure are described as follows.

The caps herein are suitable for attaching to male medical connectors 10, such as a male luer connector currently known in the art as shown in FIG. 1. FIG. 1 also illustrates areas for possible contamination "C" in a typical male luer connector of the prior art including internal surfaces, like the thread region, along with the outer surfaces of the male luer connector. The male connectors in turn are used to connect to medical devices such as catheters and tubing. In one or more embodiments, the male connector may be an intravenous tubing end, a stopcock or male lock Luer.

Figure 2:
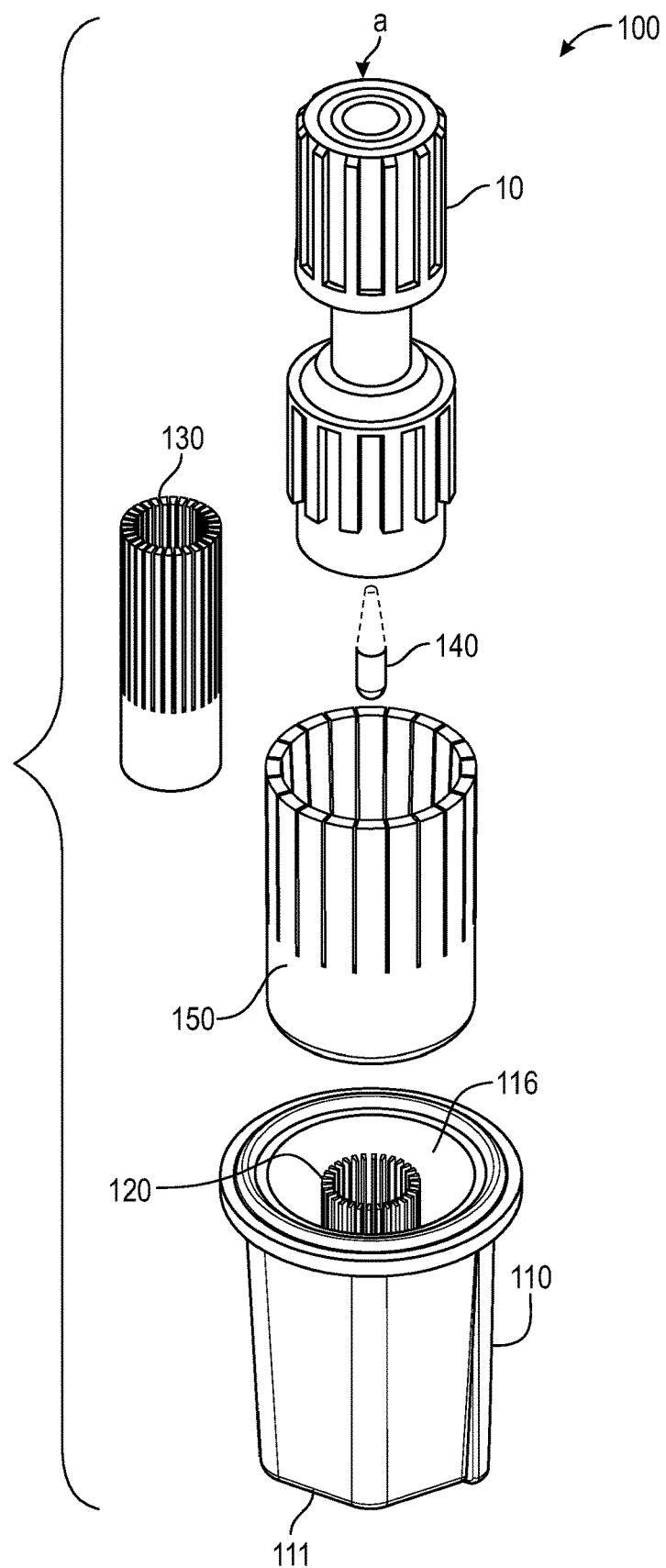
FIG. 2 illustrates an exploded perspective top view of an exemplary cap according to an embodiment of the present disclosure along with a male medical connector of the prior art of FIG. 1.
Figure 3:
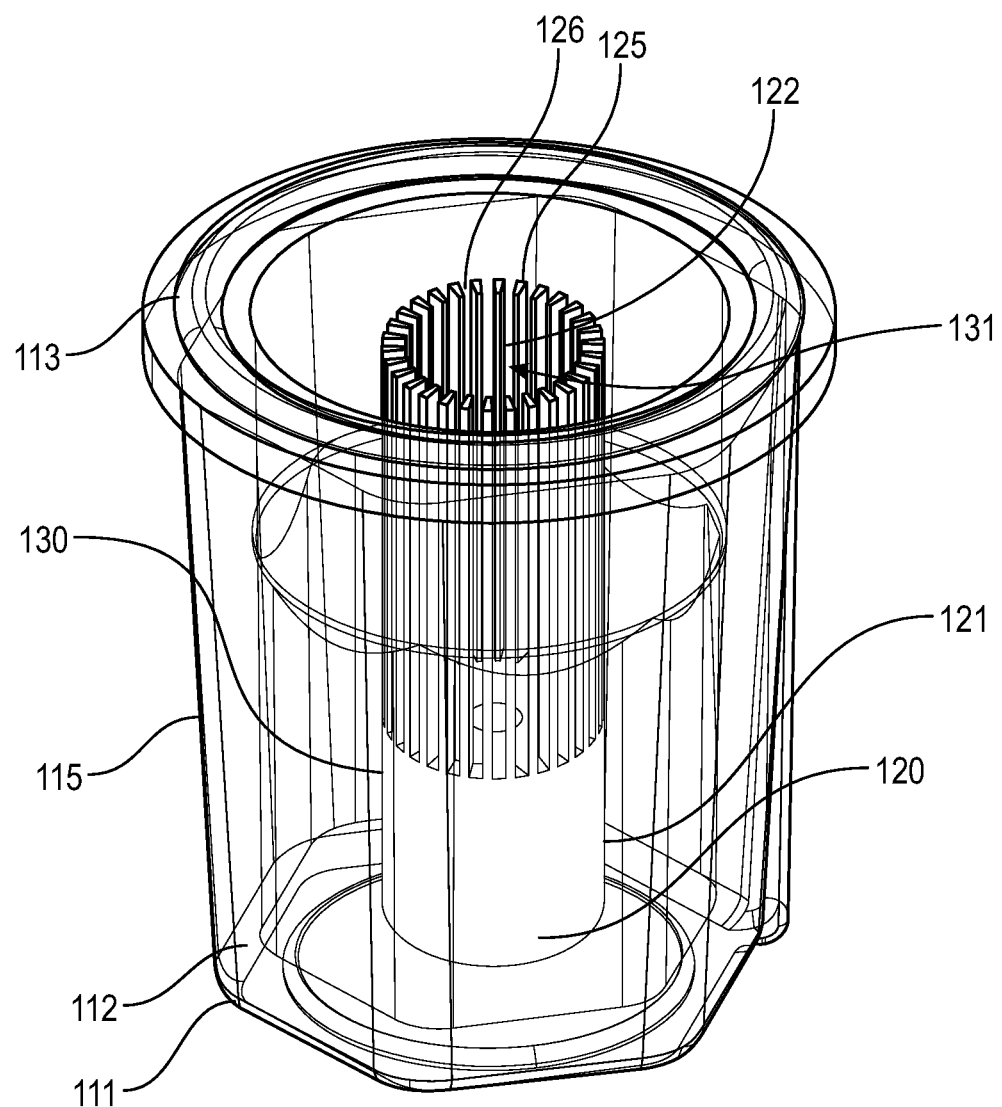
FIG. 3 illustrates a perspective top view of a cap and central post according to an exemplary embodiment as shown in FIG. 2.
Figure 4:
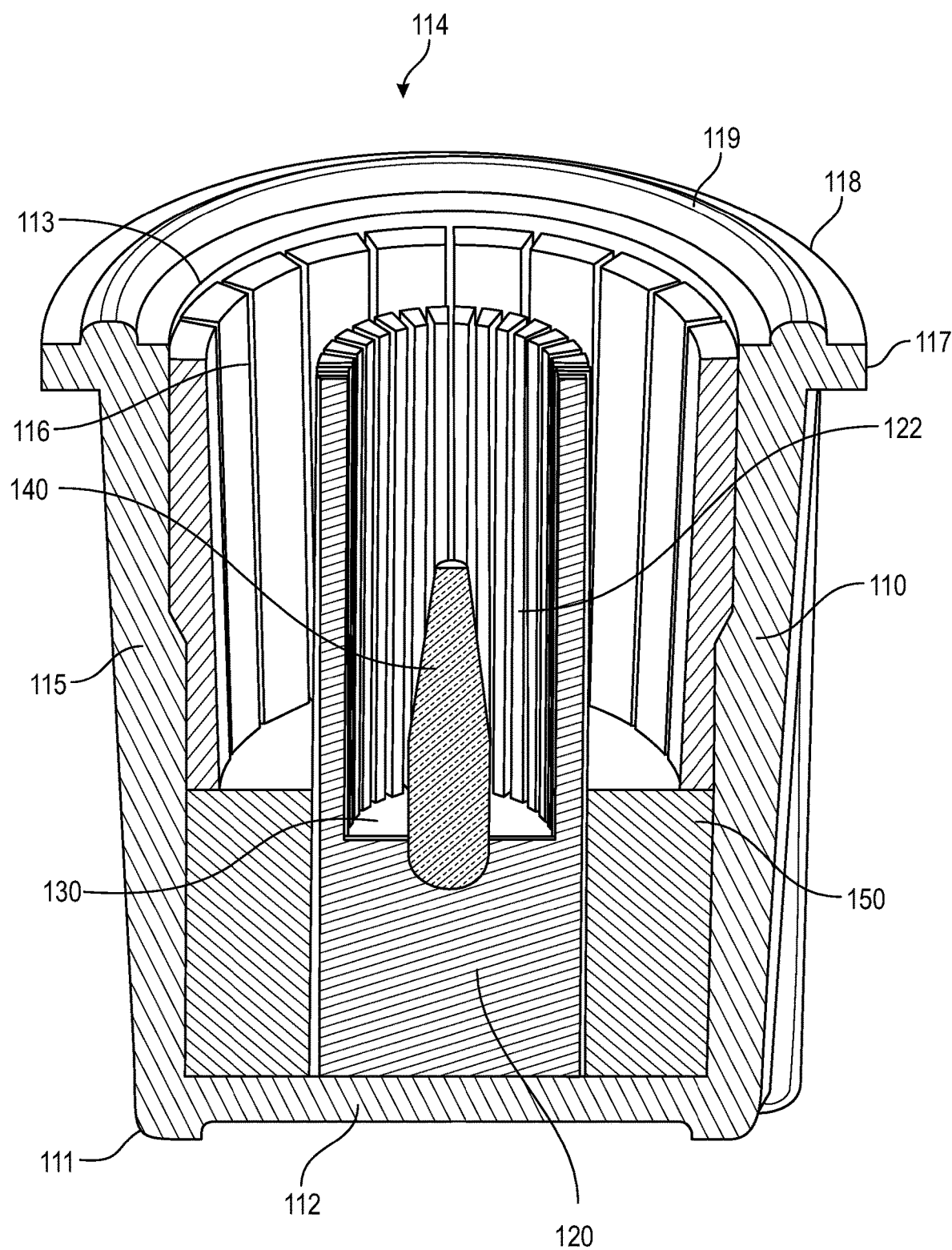
FIG. 4 illustrates a cross-sectional perspective side view of an exemplary cap according to an embodiment as shown in FIG. 2.

Turning to the figures, FIG. 2 is an exploded view of a disinfection cap according to one or more embodiments of the present disclosure along longitudinal axis "a" of an exemplary cap. FIG. 3 diagrammatically illustrates a top isometric view of the cap housing with central post in assembled form. FIG. 4 diagrammatically illustrates a cross-sectional perspective side view of the cap according to FIG. 2 in assembled form.

As shown in FIGS. 2-4, disinfection cap 100 comprises a housing 110, central post 120, foam jacket 130, central plug 140, scrubbing foam 150, and disinfectant.

A first aspect of the present disclosure relates to a disinfection cap includes a housing 110 having a closed distal end 111 comprising a distal wall 112, an open proximal end 113 defining the opening 114 to receive a hub of a male luer connector, a sidewall 115 extending from the closed distal end 111 to the open proximal end 113. The sidewall 115 of the housing is cylindrical and has a length extending from the closed distal end 111 to the open proximal end 113. The closed distal end 111, the open proximal end 113, and the cylindrical sidewall 115 define a first cavity 116 of the housing configured to receive a hub of a male luer medical connector. In one or more embodiments, the open proximal end 113 includes a peripheral ledge 117 extending radially outward from the open proximal end 113 defining an end face 118 and an sealing surface 119. The opening 114 is disposed at the open proximal end 113 of the housing 110 to receive a hub of a male luer connector.

The housing 110 can be made from a number of types of plastic materials such as polycarbonate, polypropylene, polyethylene, polyethylene terephthalate, polylactide, acrylonitrile butadiene styrene or any other moldable plastic material used in medical devices. In one or more embodiments, the housing 110 comprise a polypropylene or polyethylene material.

The disinfection cap includes a central post 120 extending from the center of the closed distal end 111 of the housing 110 and positioned within the first cavity 116. In one or more embodiments, central post 120 is molded into outer housing 110 as a single molded plastic.

In one or more embodiments, as shown in FIG. 4, the central post 120 is integrated or built into the bottom wall of the first cavity 116 of the housing 110. The central post 120 is positioned within the first cavity 116 of the housing 110 and can be essentially cylindrical and coaxial with the sidewall 115. An inner surface of the distal wall 112 can form a top of cavity 116. In an embodiment, the central post 120 is integrally formed with the housing 110. Central post 120 is integrally-formed with the distal wall of the housing. In one or more embodiments, central post is molded into housing 110 as a single molded plastic.

Figure 9:
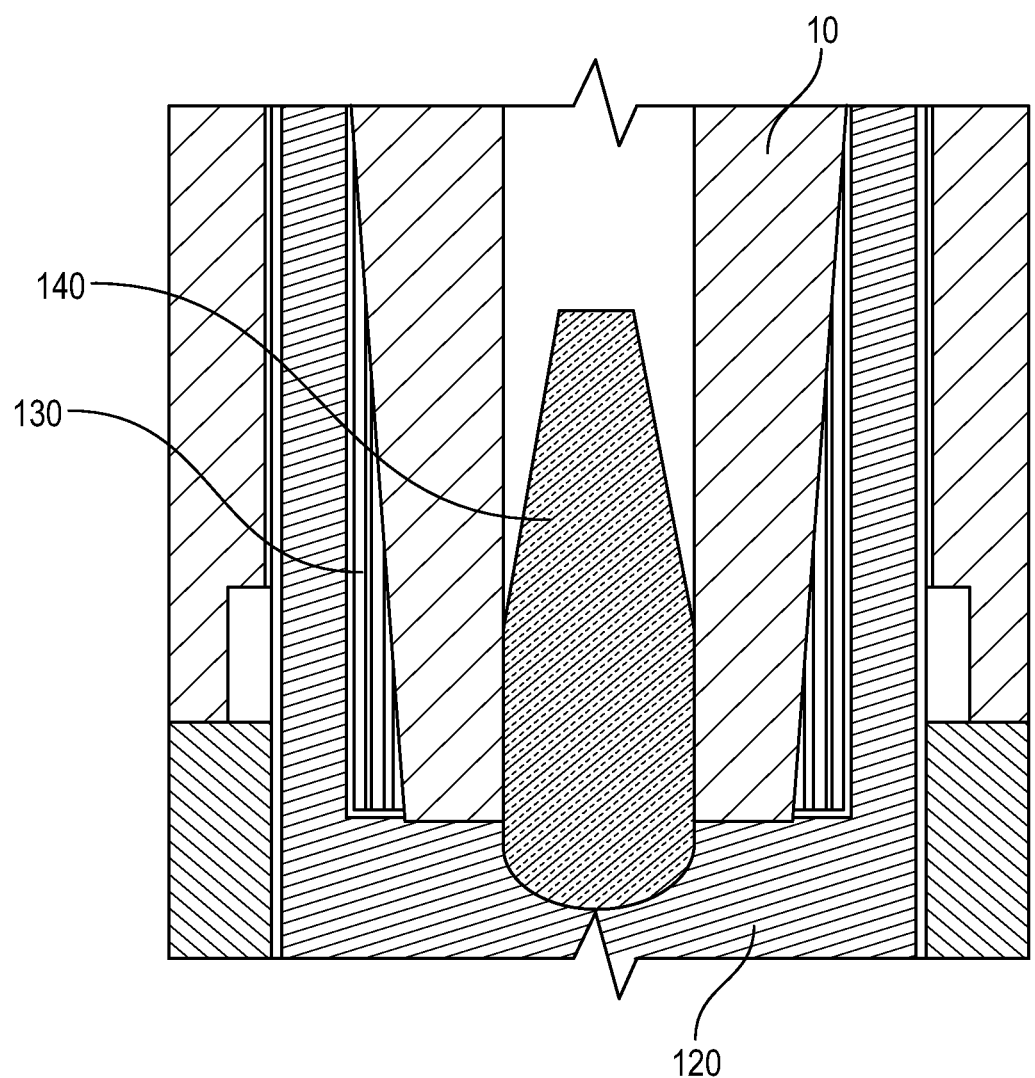
FIG. 9 illustrates a cross-section view of the cap illustrating the central plug disposed in the second cavity formed by the foam jacket according to an embodiment.

In one or more embodiments, central plug 140 is joined to the central post 120 by a ball and socket joint. The central plug 140 is free to rotate about its axis due to ball and socket joint at the root, as shown in FIG. 9.

In an alternate embodiment (not shown), the central post 120 is attached to the distal wall 112 of the housing 110 by, for example, a snap-fit attachment.

A second cavity 122 of the housing 110 is defined by an inner surface 131 of the foam jacket 130 that is disposed on top of the central post 120. The central post 120 also has an outer surface 121. In one or more embodiments, the central post also has an outer surface sufficient to interlock with a mating feature of a male needleless connector. Such connectors are generally and commonly used as catheter and other fluid-tight protective connectors in medical applications. In one or more embodiments, central post 120 can extend essentially from an inner surface of the distal wall 112 toward the open proximal end 113 of the housing 110.

In one or more embodiments, the central post 120 can extend essentially parallel to the sidewall 115 of the housing. The central post 120 can be made of plastic, or a thermoplastic elastomer (TPE), or a blend of plastic (such as polypropylene (PP) or polyethylene (PE)) with TPE material. The central post 120 can be made from any of a number of types of plastic materials such as polycarbonate, polypropylene, polyethylene, polyethylene terephthalate, polylactide, acrylonitrile butadiene styrene or any other moldable plastic material used in medical devices. In one or more embodiments, the central post 120 comprise a polypropylene or polyethylene material.

A foam jacket 130 extending from the central post 120 and the inner surface of the foam jacket 130 defines a second cavity 122 disposed within the first cavity 116. The foam jacket 130 resides in a hollow defined by the scrubbing foam 150, which in turn resides in the cavity defined by the inner surface of the central post 120. The foam jacket 130 has an inner surface and outer surface to engage the medical connector. In one or more embodiments, the foam jacket 130 is made of an absorbent material. In one or more embodiments, the absorbent material is a nonwoven material, foam or a sponge. In a specific embodiment, the foam is a polyurethane foam. In one or more embodiments, the top portion of the foam jacket 130 that extends beyond the top surface of the scrubbing foam includes one or more prongs 135 separated by one or more respective slit 136 that correspond to and are complementary to the one or more prongs 125 separated by one or more respective slits 126 in the top portion of the central post 120. Upon assembly, the foam jacket 130, which has similar precut projections formed by prongs 135 and slits 136 as in the central post, can be disposed over the central post 120.

A central plug 140 disposed in the center of the central post 120 extending from a top wall of the central post 120 and extending into the second cavity 122 of the foam jacket 130. The central post extends from an interior surface of the bottom wall of the housing; and can be integrally-formed with the housing. The disinfecting caps disclosed herein are advantageous because the inclusion of a central plug minimizes ingress of disinfectant, such as isopropyl alcohol or chlorhexidine, into the central lumen of medical connectors.

The external geometry of the central plug 140 is sufficiently complementary to open lumen Luer connectors for engaging male luer connectors. When the central plug 140 engages with an open lumen in Luer connectors such as a catheter or stopcock, the complementary inner Luer wall applies radial pressure on the insert to make an interference fit. The bottom surface of the central plug 140 can cover the open lumen of the Luer tip on the connector, thereby mitigating disinfectant ingress.

The central plug 140 may be a solid material that is soft to compress longitudinally so when the cap is attached to male Luers such as needleless connectors and IV tubing end, it may retract toward a top wall at a closed end of cap housing, but rigid enough radially so it can form enough interference with open Luer such as catheters or stopcocks.

As per established toxicology limits, maximum allowable limit is 14.3 mg/kg/day of 70% isopropyl alcohol (IPA). A maximum ingress limit per disinfectant cap may be calculated by dividing the maximum allowable limit of 14.3 mg/kg/day of 70% IPA by the total number of disinfectant caps used per day. For example, assuming a maximum of 16 caps used per day and worst-case patient being a 1 kg pre-term neonate, the ingress limit would be 0.89 mg of 70% IPA per cap. The central plug 140 allows for minimum/low IPA ingress, or ideally to prevent IPA ingress, by sealing due to cylindrical lateral surface. The central plug 140 fits into the lumen of male luer and thus reduces/avoids IPA ingress into the IV line. Central plug 140 keeps the male luer's central line plugged so that minimal IPA ingress takes place in the line. The ball and socket joint of the central plug allows the central plug 140 to rotate freely inside the male luer and hence provides minimum resistance in rotation. Central plug 140 blocks the IV line during disinfection so well that it blocks the IV line to minimize disinfectant going into the IV line. The central post 120 is free to rotate about its axis due to Ball and Socket joint at the root, as shown in FIG. 9.

Scrubbing foam 150 is disposed within a first cavity 116. In one or more embodiments, upon assembly, the scrubbing foam 150 is in direct contact with an interior surface of the distal wall 112. In one or more embodiments, the scrubbing foam is assembled into the Central Post 120.

In one or more embodiments, the scrubbing foam 150 is made of an absorbent material. In one or more embodiments, the absorbent material is a nonwoven material, foam or a sponge. In a specific embodiment, the foam is a polyurethane foam.

Central post 120 extends from the closed distal end 111 of the housing 110 and positioned within the first cavity 116 supports the foam jacket 130 and provides internal rigidity to the foam jacket 130. In one or more embodiments, the top portion of the central post 120 that extends beyond the top surface of the scrubbing foam includes one or more prongs 125 separated by one or more respective slits 126. In one or more embodiments, at least one of the prongs 125 or slits 126 can be configured to bend to facilitate interference fit between the central post and the mating feature of a male needleless connector. In one or more embodiments, central post 120 can extend essentially from an inner surface of the distal wall 112 toward the open proximal end 113 of the housing 110. In one or more embodiments, the central post 120 can extend essentially parallel to the sidewall 115 of the housing.

The Central Post 120 also centers the scrubbing foam 150 and supports the scrubbing foam 150 by providing a fixed location and also provides rigidity the scrubbing foam 150 which is disposed in the first cavity 116 of the housing 110 between the central post 120 and the sidewall 115 of the housing.

Figure 5:
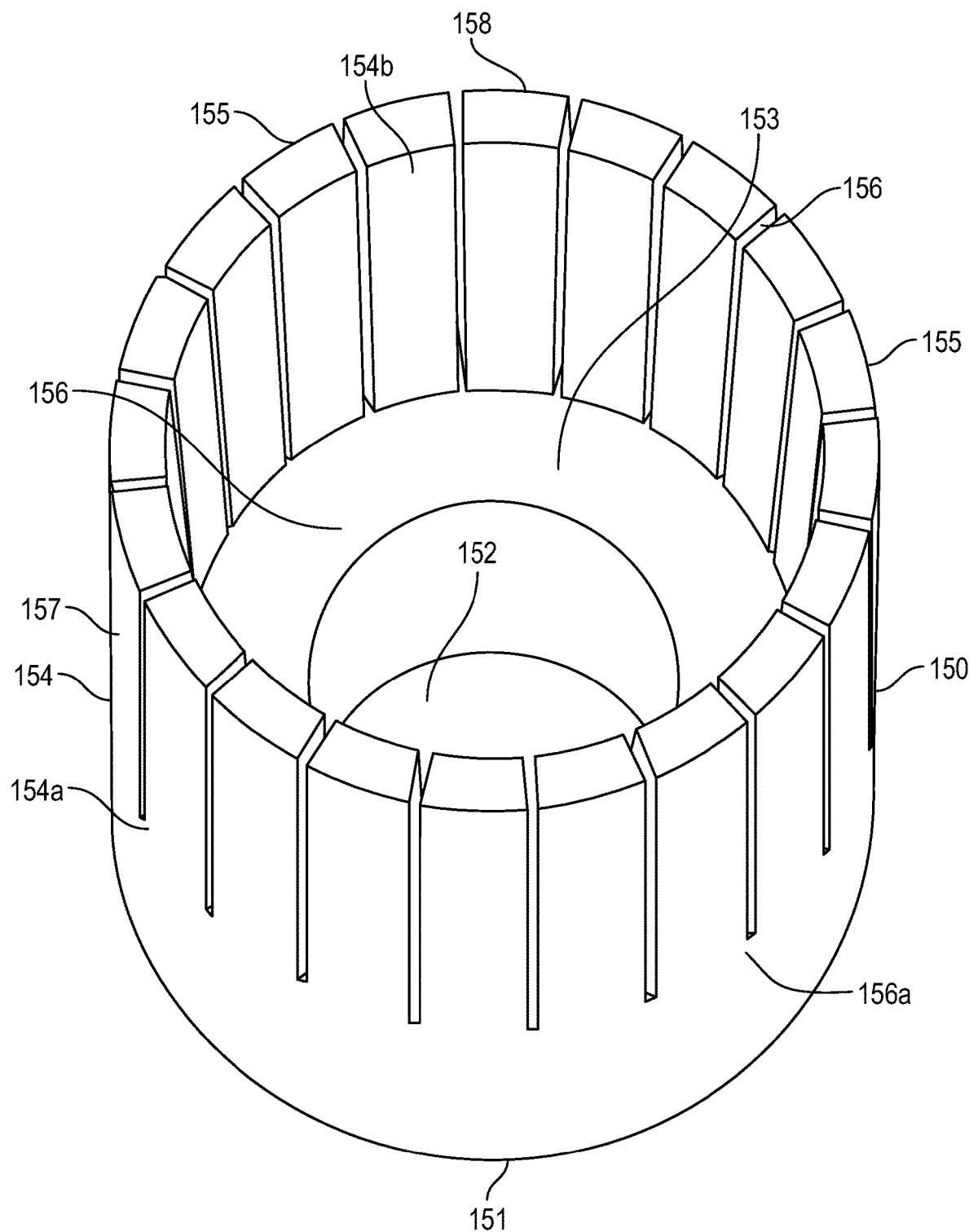
FIG. 5 illustrates a perspective top view of the scrubbing foam of FIG. 2.

FIG. 5 provides a perspective top view of the scrubbing foam 150 according to according to an embodiment. In one or more embodiment, the scrubbing foam 150 comprises a cylindrical body, bottom end 151, an annular wall 154 having a length extending from the bottom end 151 to an open top portion 157 that defines a chamber containing a disinfectant or antimicrobial agent. The bottom end 151 of the scrubbing foam defines an end face 152 and includes a peripheral ledge 153 extending radially inward from the annular wall 154 to make contact with the distal tip of the male luer connector, the peripheral ledge has a central aperture sized to wrap around the central post 120. The peripheral ledge 153 defines an engagement surface for the distal tip and outer surface of the male luer connector. In one or more embodiments the scrubbing foam 150 includes a plurality of slits 156 forming prongs 155 in the scrubbing foam 150. In one or more embodiments, the plurality of slits 156 are pre-cut in the body of the scrubbing foam 150 for effective cleaning of contaminated surfaces. In one or more embodiments, the plurality of slits 156 of the scrubbing foam 150 are in the form of finger-like prongs 155 configured for scrubbing. In one or more embodiments, the finger-like prongs are configured as projections or bristles. Scrubbing foam 150 is pressed into the first cavity 116 which can retain any disinfectant within it due to surface tension and wettability feature. Scrubbing foam 150 disinfects the outer wall surface of the male luer connector through scrubbing. Annular wall 154 has a slotted end formed by slits 156 and a non-slotted end. In one or more embodiments, the slits 156 extends less than about halfway along the annular wall 154. The slits 156 allow a Luer tip of a male Luer connector to be inserted in the hollow cylinder cavity so the sponge side wall can interact with a side surface of the male Luer connector and release the disinfectant onto a Luer surface. The slits 156 may open up when the male Luer connector is inserted onto the cap and the Luer opens up the slot by pushing both sides of the sponge away.

The annular wall 154 of the scrubbing foam 150 comprises an exterior wall surface 154A and an interior wall surface 154B. The interior wall surface 154B defines an opening adjacent the bottom end. The inner surface of the top portion of the scrubbing foam 150, the outer surface of the foam jacket 130 and the top surface of the peripheral ledge 153 define a concentric cavity. The top portion 157 of the sidewall of the scrubbing foam 150 includes a plurality of slits 156 that exists radially around the top portion 157 of the scrubbing foam 150 and extend from the top of the peripheral ledge to the open end, which define multiple prongs 155 around top portion 157 of the scrubbing foam 150. The faces 158 of the prongs 155 may be chamfered at the top edge of the scrubbing foam 150. The prongs 155 have bottom ends defined by where each slit ends 156a near the peripheral ledge. The slits 156 provide gaps within which disinfectant can cling and the slits also flexibility to each prong 155, allowing the scrubbing foam 150 to slide along an outer surface of the male luer connector when a force along the central axis (e.g., "a" of FIG. 2) is applied along the foam jacket 130 and the inner surface of the scrubbing foam 150, such as when a male luer connector is inserted into the cap.

In one or more embodiments the foam jacket 130 includes a plurality of slits 136 in the foam jacket 130. In one or more embodiments, the plurality of slits 136 are pre-cut in the body of the foam jacket 130 for effective cleaning of contaminated surfaces. In one or more embodiments, the plurality of slits of the foam jacket 130 are in the form of finger like prongs 135 or projections configured for scrubbing. Disinfection of threaded region of a male luer is achieved when the foam jacket 130 wetted with disinfectant contacts the sides wall of luer portion and internal threads in a male luer which scrubs and cleans these regions. Passive disinfection is achieved using alcohol-impregnated catheter hub protection caps. These disinfection caps contain a sponge impregnated with alcohol that can be attached to the male medical connector, thus protecting the access point from contamination as well as providing disinfection. Active disinfection is performed using a wipe to mechanically loosen the microorganisms allowing the disinfectant to destroy the microorganisms. This procedure is often referred to as 'scrubbing the hub'. The finger-like prongs 135 or projections in the foam jacket 130 are used for scrubbing and disinfecting the contaminated surfaces of the male luer connector. Foam jacket 130 scrubs the incoming male Luer's front tip face, outer surface of Luer and the male luer threaded. Central plug 140 is joined to the central post 120 by a ball and socket joint. The central plug 140 is free to rotate about its axis due to Ball and Socket joint at the root. Central post 120 supports the foam jacket 130 and provides internal rigidity. The central post which is lined with foam jacket 130 which has multiple bristle like structures enter in the region between outer surface of male luer taper and threaded region of the male luer connector. By clockwise and counter-clockwise rotation, these multiple bristle like structures actively remove the contaminants by loosening them with mechanical scrubbing action and further disinfect and kill the microbes by chemical disinfection due to disinfectant present in the cap (IPA).

When clockwise and counter-clockwise rotation is being realized, the central plug 140 remains tightly fitted to the inner lumen and rotates along with the male connector due to a ball and socket joint between the central plug 140 and central post. This does not allow relative motion between the central plug 140 and male connector thus avoiding IPA ingress into the IV line.

Foam jacket 130 which has similar precut prongs 135 and slits 136 that correspond to 125 and slits 126 in the central post 120, allows the foam jacket 130 to be disposed onto the central post 120. Thus central post 120 provides rigidity to the foam Jacket 130. The central post 120 has a socket joint like feature into which a Central Plug 140 is fitted (with defined tolerances) so that it remains in a fitted or fixed position until it plugs the lumen of an incoming male luer connector. The foam jacket 130 scrubs and disinfects the proximal tip, side wall and internal threaded region of a male luer connector.

Figure 6:
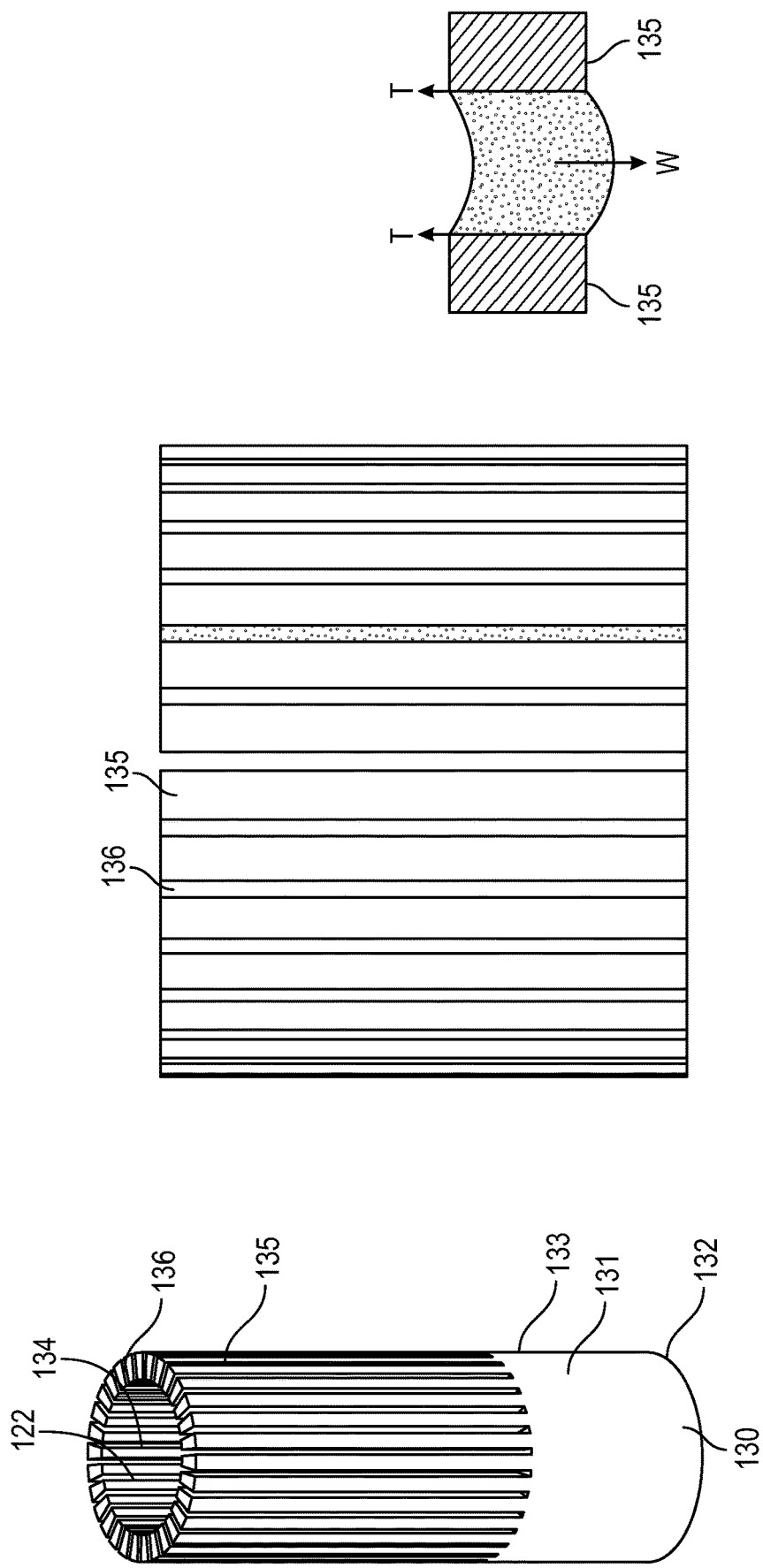
FIG. 6 illustrates a cross-sectional perspective top view of the foam jacket sponge of FIG. 2
Figure 7:
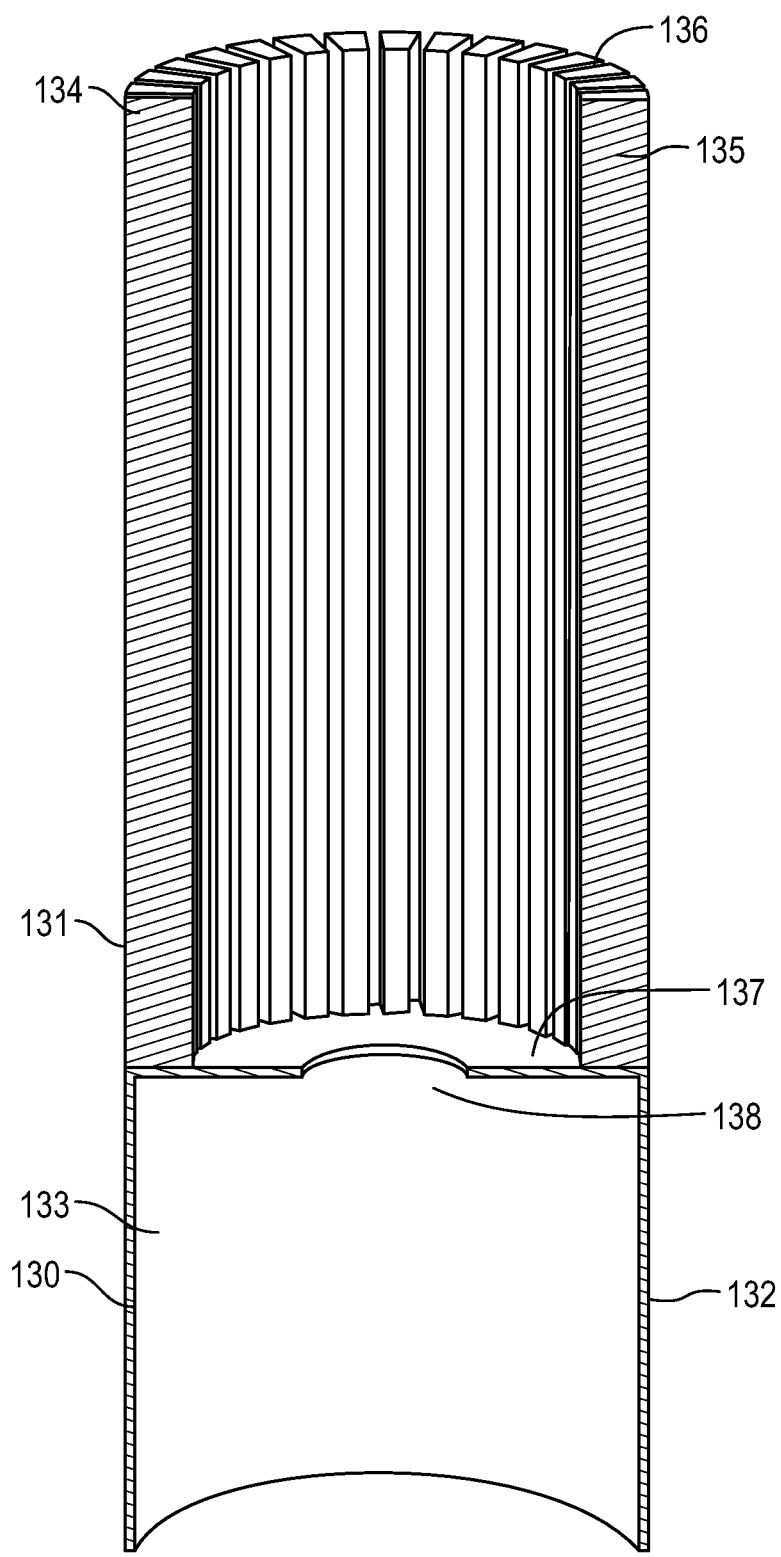
FIG. 7 illustrates a cross-sectional view of a foam jacket according to an embodiment.

FIG. 6 provides a perspective top view of the foam jacket 130 according to an embodiment. In one or more embodiment, the foam jacket 130 comprises an integral cylindrical body 131, bottom end 132, an annular wall 133 having a length extending from the bottom end 132 to an open proximal end 134 that defines a second cavity 122 containing a disinfectant or antimicrobial agent. As shown in FIG. 7, the bottom end 132 defines an end face and includes a peripheral ledge 137 extending radially inward from the annular wall to make contact with the distal tip of the male luer connector, the peripheral ledge 137 has a central aperture 138 sized to house the central plug 140. The peripheral ledge 137 defines an engagement surface for the distal tip of the male luer connector. The annular wall of the foam jacket 130 comprises an exterior wall surface and an interior wall surface. The inner surface of the top portion of the foam jacket 130 and the top surface of the peripheral ledge define a second cavity 122 containing a disinfectant or antimicrobial agent. The top portion of the sidewall of the foam jacket 130 includes a plurality of slits that exists radially around the top portion 134 of the foam jacket 130 and extend from the top of the peripheral ledge to the open end, which define multiple prongs 135 around top edge of the foam jacket 130. The faces of the prongs 135 may be chamfered at the top edge of the foam jacket 130. The prongs 135 have bottom ends defined by where each slit 136 ends near the peripheral ledge 137. The slits 136 provide gaps within which disinfectant can cling and the slits also provide flexibility to each prong 135, allowing the foam jacket 130 to slide along threads and an outer surface of the male luer connector when a force along the central axis (e.g., "a" of FIG. 2) is applied along the foam jacket 130 and the inner surface of the scrubbing foam, such as when a male luer connector is inserted into the cap. Annular wall 133 spans between a slotted end formed by slits 136 and a non-slotted end. In one or more embodiments, the slits 136 extends less than about halfway along the annular wall 133. The slits 136 allow a Luer tip of a male Luer connector to be inserted in the hollow cylinder cavity so the sponge side wall can interact with a threads and side surface of the male Luer connector and release the disinfectant onto a Luer surface. The slits 136 may open up when the male Luer connector is inserted into the cap and the Luer opens up the slot by pushing both sides of the sponge away.

The central plug 140 resides in a hollow defined by the scrubbing foam 150, which in turn resides in the cavity defined by the inner surface of the central post 120.

In one or more embodiments, the external geometry of the scrubbing foam 150 and/or the foam jacket 130 may have a tapered edge with a range of angles that can be sufficiently complementary to a male Luer taper.

The first cavity 116 houses the Scrubbing Foam (150), Central Plug (140), Central Post (120), Foam Jacket (130) and disinfectant within it. In one or more embodiments, disinfectant is filled in the first cavity 116 to wet the scrubbing foam 150 and the second cavity 122 to wet the foam jacket 130 to disinfect the threads and outer surface of a male luer connector. In one or more embodiments, disinfectant is isopropyl alcohol (IPA).

Passive disinfection is achieved using disinfectant-impregnated scrubbing foam 150 and foam jacket 130 housed in the first cavity of the cap 100 which contact NFC, thus protecting the access point from contamination as well as providing disinfection. Surface tension between the molecules of the liquid disinfectant when interacting with the pre-cut foam plurality of finger-like prongs (135, 155) in the body of the foam jacket 130 and scrubbing foam 150 both which holds IPA between pre-cut foam structure to keep the foam wetted and allow the liquid IPA to cling to foam projections' structure on both the scrubbing foam 150 and foam jacket 130 due to surface tension. The disinfection is based on using foam jacket 130 which has similar prongs 135 that correspond to prongs 125 in the central post 120. The corresponding prongs (125, 135) allow the scrubbing foam 150 and foam jacket 130 to be assembled together. Due to surface tension between the foam jacket 130, the droplets of the liquid disinfectant are held in the structure. A combination of mechanical and chemical disinfection is achieved when foam jacket 130 is inserted into the threaded portion of the male luer 10 and scrubbed allowing all the external surfaces of Male Luer to get disinfected. Recent studies have concluded that just chemical disinfection is insufficient to attained 4-log reduction of microbes. However, mechanical scrubbing that causes physical removal of contaminants in combination with chemical disinfection, e.g. with isopropyl alcohol (IPA), plays a key role in attaining 4-log reduction.

The interaction of the plurality of slits (126, 136, 156) resulting in the finger-like prongs or projections with the surface tension properties of the liquid disinfectant allows for a minimum volume of liquid disinfectant, such as IPA, to be used for scrubbing. As illustrated in FIG. 6, liquid IPA clings between consecutive prongs (125, 135, 155) due to the interaction of the foam projections and liquid disinfectant clinging per the formula: W=2T wherein W: Weight of liquid IPA clinging and T: Surface tension on liquid IPA from foam projection.

Figure 10:
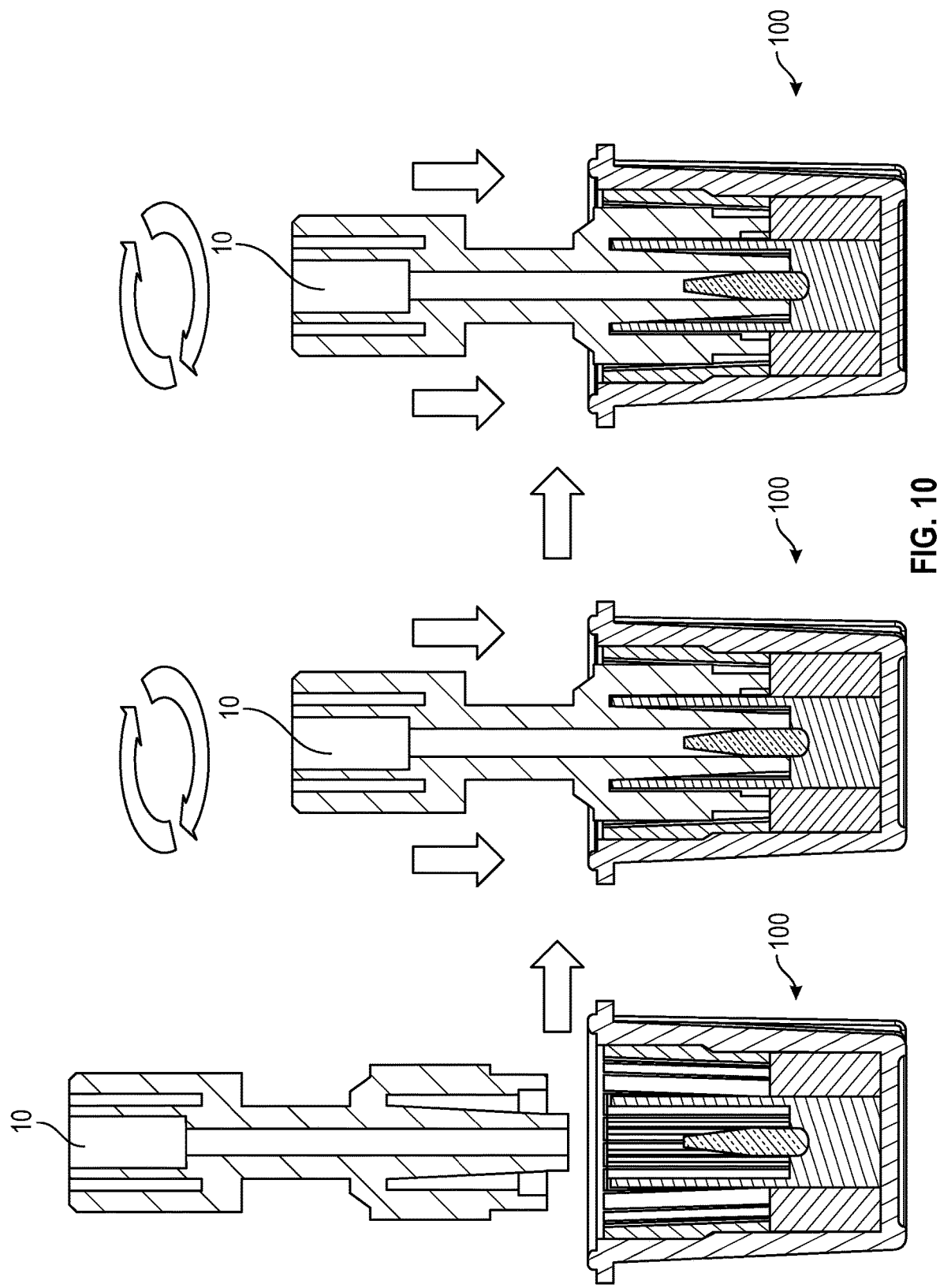
FIG. 10 illustrates a perspective cross-section view of a medical connector in combination with a cap according to an embodiment.

The caps herein can achieve disinfection when used on male Luer connectors by passive disinfection when the male luer connector is inserted into cap and makes contact with the liquid disinfectant which is wetted in the foam jacket 130 and the scrubbing foam 150 and an active disinfection when the male luer connector is rotated back and forth (clockwise and counterclockwise) in a twisting motion while maintaining contact with the plurality of slits of the foam jacket 130 and the scrubbing foam 150. As shown in FIG. 10, when the luer medical device is inserted into the cap, disinfectant contacts the distal tip to provide an initial passive disinfection. Male luer Device 10 is inserted into cap 100 and the luer device 10 is rotated in a repeated clockwise and counterclockwise direction in a twisting motion to disinfect the outer surfaces and threads of the male luer via an active disinfection. The twisting action during attachment of the cap and sponge allows the finger-like projections of the prongs (125, 135, 155) to contact the internal threads and outer surface to the male luer with a scrubbing action which contributes towards physical removal of microorganisms (i.e., cleaning). Thus the twisting action increases disinfection activity when compared to use of 70% IPA alone. Thus, an advantage of using the cap of the present disclosure is that the cap of the present disclosure allows for disinfection of male luer connectors with both chemical disinfectant (passive disinfection) and scrubbing action (active disinfection). Thus, the combination of passive disinfection with active disinfection results in improved disinfection results. Once disinfection is completed, the cap 100 does not remain connected on the male connector and cap 100 can be discarded.

The caps are designed to be compatible in interacting with various disinfectants. In one or more embodiments, the disinfectant of the disinfectant sponge may include variations of alcohol or chlorhexidine. In one or more embodiments, the disinfectant is selected from the group consisting essentially of isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorohexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof. In a specific embodiment, the disinfectant comprises at least one of chlorhexidine gluconate and chlorhexidine diacetate. In one or more embodiments, the disinfectant is a fluid or a gel.

In an exemplary implementation, a peelable lid can be provided to seal the opening 114 prior to use of cap 100, for example, by attachment to sealing surface 119 of end face 118 of the open proximal end 113 of housing 110. In one or more embodiments, the peelable lid comprises an aluminum or multi-layer polymer film peel back top. In a specific embodiment, the peelable lid is heat-sealed or induction sealed to the open end of the cap. In one or more embodiments, the peelable lid comprises a moisture barrier. According to exemplary embodiments of the disclosure, the cap 100 can receive a tip or hub of a needleless connector, for example after the peel seal sealing cavity is removed or when the peal sealing film is pierced, within the cavity 116.

Figure 8:
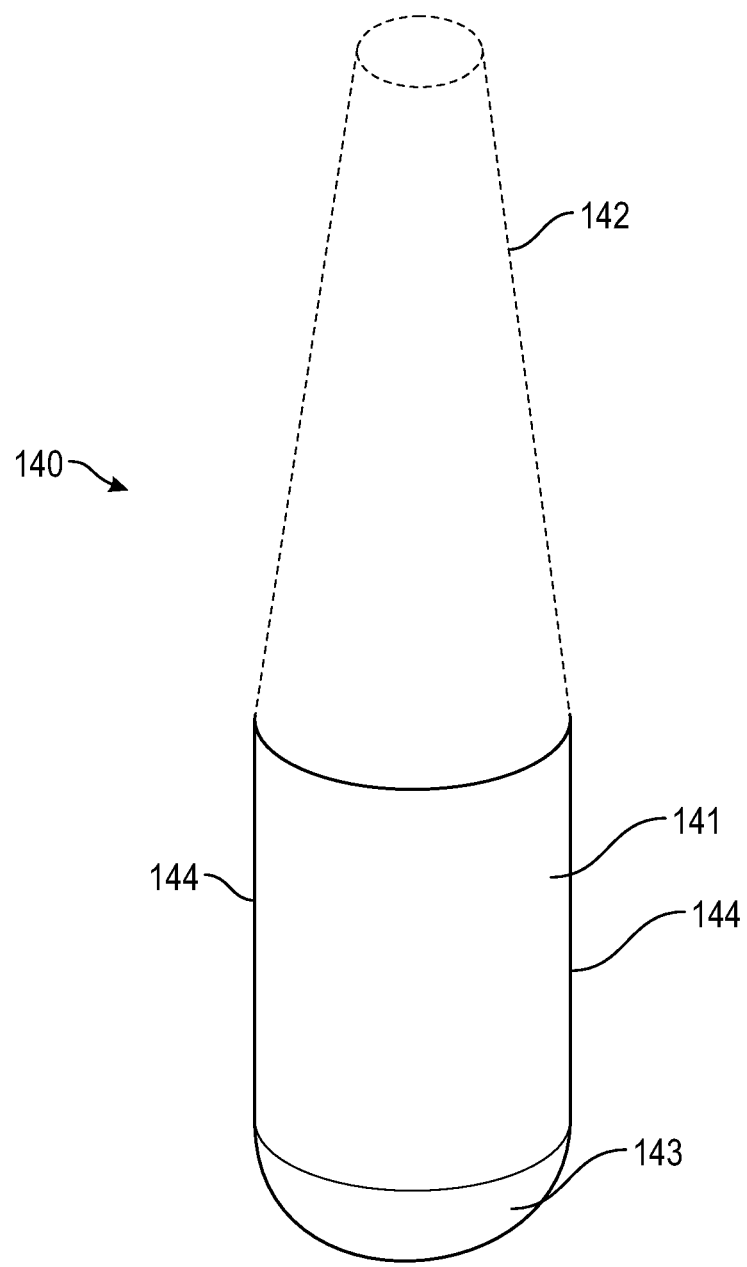
FIG. 8 illustrates a perspective top view of the central plug of FIG. 2.

FIG. 8 illustrates a perspective top view of the central plug 140 and FIG. 9 illustrates a perspective cross-section view of the central plug 140 embedded in the central post 120. The central plug 140 comprises a substantially cylindrical body 141 with a frustoconical top 142 having a bottom wall 143, which spans the sidewall 144 of the central plug. In one or more embodiments, the bottom wall 143 of the central plug 140 comprises a tapered surface. In one or more embodiments, the central plug 140 attaches to an opening or channel in a center of the top wall of the central post.

A further aspect of the present disclosure pertains to a method of disinfecting a medical connector. The method comprises connecting the cap of one or more embodiments to a medical connector, wherein connecting includes contacting the medical connector onto the inner or outer surface of the first cavity 116 and second cavity 122 of the cap upon insertion of the medical connector into the cap such that the medical connector contacts the absorbent material and the disinfectant or antimicrobial agent.

In use, insertion of the male medical connector 10 into the first cavity 116 and second cavity 122 of the cap allows the connector to contact the disinfectant disposed within the scrubbing foam 150 and foam jacket 130 allowing disinfectant to be dispensed onto the threads and outer surfaces of the male luer connector to disinfect. When a male medical luer connector is inserted inside cap 100, first the central plug 140 fits inside the inner lumen of luer blocking this entryway so that liquid disinfectant IPA from the cap does not percolate and ingress into the inner lumen of the male luer connector. Upon assembly of the cap 100 with a male medical connector 10, a lumen edge of the male luer connector compresses the foam jacket 130 and scrubbing foam 150 toward the distal wall at the closed distal end 111 of the housing 110, allowing disinfectant to be dispensed onto the threads and outer surfaces of the male luer connector. When the central plug 140 engages with the open lumen, a complementary inner wall, e.g. Luer wall, applies radial pressure on the central plug to make an interference fit with the inner wall of the male luer connector, which mitigates and/or prevents disinfectant ingress into the lumen.

Scrubbing foam conforms the male IV connector's outer body and cleans the collar as well due to mechanical as well as chemical action.

The exemplary caps of the present disclosure are capable of continuous disinfection of a connector and minimize ingress of microbial agents.

Exemplary caps 100 engage with male Luer connectors and upon mounting the cap onto a male Luer connector, the male Luer connector is inserted into the second cavity 122. The disinfectant of the disinfectant sponge contacts the male Luer connector after insertion of the connector into the second cavity 122 of the exemplary caps 100. After disinfecting the Male connector, cap 100 does not remain connected onto the male connector and can be discarded.

A further aspect of the present disclosure pertains to an assembly. The assembly comprises the cap of one or more embodiments connected to a medical connector. In one or more embodiments, the medical connector is a male Luer connector or needleless connector.

Embodiments

Various numbered embodiments are listed below. It will be understood that the embodiments listed below may be combined with all aspects and other embodiments in accordance with the scope of the invention.

A cap comprising:
a housing having a closed distal end, a distal wall, an open proximal end defining an opening, a sidewall extending from the closed distal end to the open proximal end;
and a first cavity configured to receive a hub of a male medical connector;
a scrubbing foam disposed within the first cavity;
a central post extending from the distal wall of the housing and positioned within the first cavity;
a foam jacket disposed on the central post and defining a second cavity;
a central plug disposed in the center of the central post extending from the top wall of the central post and extending into the second cavity of the foam jacket; and
a liquid disinfectant or antimicrobial agent, or combinations thereof.

The cap of embodiment 1, wherein upon engagement of the cap with a male medical connector, the scrubbing foam and foam jacket contacts a thread and an outer surface of the male medical connector.

The cap of embodiment 2, wherein when a lumen of the male medical connector is open to the cap, the central plug enters the lumen to inhibit disinfectant ingress into the lumen.

The cap of embodiment 1, wherein the scrubbing foam comprises an annular wall having a slotted end formed by a plurality of slits and a plurality of prongs.

The cap of embodiment 1, wherein the foam jacket comprises an annular wall having a slotted end formed by a plurality of slits and a plurality of prongs.

The cap of embodiment 1, wherein the central post comprises an annular wall having a slotted end formed by a plurality of slits and a plurality of prongs.

The cap of embodiment 1, wherein the central plug is disposed in an aperture of the central post extending from the top wall of the central post and extending into the second cavity of the foam jacket.

The cap of embodiment 1, wherein the foam jacket contacts a front tip face, outer surface of Luer and internal thread of the male medical connector when the male medical connector enters the first cavity and second cavity.

The cap of embodiment 1, wherein the scrubbing foam contacts a front tip face and outer luer surface of the male medical connector when the male medical connector enters the first cavity and second cavity.

The cap of embodiment 1, wherein the central plug and central post are joined by a ball and socket joint.

The cap of embodiment 1, wherein an outside geometry of the central plug comprises a frusto-conical tapered surface effective to complement an inner surface of a lumen of the medical connector.

The cap of embodiment 1, wherein the housing comprises a polymeric material selected from the group consisting of polyethylene, polypropylene, thermoplastic elastomer (TPE), or combinations thereof.

The cap of embodiment 1, wherein the male medical connector comprises a male Luer connection.

The cap of embodiment 1, wherein the disinfectant or the antimicrobial agent is selected from the group consisting essentially of: isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorhexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof.

The cap of embodiment 14, wherein the disinfectant or antimicrobial agent comprises at least one of chlorhexidine gluconate and chlorhexidine diacetate.

The cap of embodiment 1, wherein the central post is integrally-formed with the distal wall of the housing.

The cap of embodiment 5, wherein the liquid disinfectant or antimicrobial agent clings between the plurality of slits and the plurality of prongs.

A method of disinfecting a medical connector comprising: placing the cap of claim 1 onto a male medical connector by contacting the distal tip and threads of the medical connector with the scrubbing foam and foam jacket and the central plug inhibits disinfectant ingress into a lumen of the medical connector.

A medical assembly comprising the cap of claim 1 connected to a medical connector having a male luer connection.

The embodiments of the present disclosure fulfill a current need by providing a device which disinfects the threaded region of a male luer connector with both passive disinfection and active disinfection while simultaneously reducing or avoiding ingress of disinfectant fluid into the male lumen.

While the present disclosure has been shown and described with reference to certain exemplary embodiments thereof, it will be understood by those skilled in the art that various changes in form and details may be made therein without departing from the spirit and scope of the embodiments of the present disclosure. For example, a disinfection sponge can comprise any suitable disinfecting or other application-specific substance, and can be made of any suitable material. Furthermore, any of the features or elements of any exemplary implementations of the embodiments of the present disclosure as described above and illustrated in the drawing figures can be implemented individually or in any combination(s) as would be readily appreciated by skilled artisans without departing from the spirit and scope of the embodiments of the present disclosure.

In addition, the included drawing figures further describe non-limiting examples of implementations of certain exemplary embodiments of the present disclosure and aid in the description of technology associated therewith. Any specific or relative dimensions or measurements provided in the drawings other as noted above are exemplary and not intended to limit the scope or content of the inventive design or methodology as understood by artisans skilled in the relevant field of invention.

Other objects, advantages and salient features of the disclosure will become apparent to those skilled in the art from the details provided, which, taken in conjunction with the annexed drawing figures, disclose exemplary embodiments of the disclosure.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has provided a description with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the disclosure. Thus, it is intended that the present disclosure include modifications and variations that are within the scope of the appended claims and their equivalents.

What is claimed is:

1. A cap comprising:
   a housing having a closed distal end, a distal wall, an open proximal end defining an opening, a sidewall extending from the closed distal end to the open proximal end, the sidewall having an outer surface and an inner surface; and a first cavity configured to receive a hub of a male medical connector;
   a scrubbing foam disposed within the first cavity, the scrubbing foam lining the inner surface of the sidewall;
   a central post extending from the distal wall of the housing and positioned within the first cavity;
   a foam jacket disposed on the central post and defining a second cavity;
   a central plug disposed in the central post and extending into the second cavity of the foam jacket; and
   a liquid disinfectant or antimicrobial agent, or combinations thereof,
   wherein the scrubbing foam has a bottom end, a top end, an annular wall extending from the bottom end to the top end, a peripheral ledge near the bottom end extending radially inward from the annular wall and toward the foam jacket, and a plurality of slits disposed between the top end and the peripheral ledge.

2. The cap of claim 1, wherein upon engagement of the cap with a male medical connector, the scrubbing foam and the foam jacket contact a thread and an outer surface of the male medical connector.

3. The cap of claim 2, wherein when a lumen of the male medical connector is open to the cap, the central plug enters the lumen to inhibit disinfectant ingress into the lumen.

4. The cap of claim 1, wherein the scrubbing foam annular wall has a slotted end and a non-slotted end, the slotted end formed by the a-plurality of slits and a plurality of prongs.

5. The cap of claim 1, wherein the foam jacket comprises an annular wall having a slotted end formed by a plurality of slits and a plurality of prongs.

6. The cap of claim 1, wherein the central post comprises an annular wall having a slotted end formed by a plurality of slits and a plurality of prongs.

7. The cap of claim 1, wherein the central plug is disposed in an aperture of the central post and extending into the second cavity of the foam jacket.

8. The cap of claim 1, wherein the foam jacket contacts a front tip face, outer surface of Luer and internal thread of the male medical connector when the male medical connector enters the first cavity and the second cavity.

9. The cap of claim 1, wherein the scrubbing foam contacts a front tip face and outer luer surface of the male medical connector when the male medical connector enters the first cavity and second cavity.

10. The cap of claim 1, wherein the central plug is joined to the central post by a ball and socket joint.

11. The cap of claim 1, wherein an outside geometry of the central plug comprises a frusto-conical tapered surface effective to complement an inner surface of a lumen of the male medical connector.

12. The cap of claim 1, wherein the housing comprises a polymeric material selected from the group consisting of polyethylene, polypropylene, thermoplastic elastomer (TPE), or combinations thereof.

13. The cap of claim 1, wherein the male medical connector comprises a male Luer connection.

14. The cap of claim 1, wherein the liquid disinfectant or antimicrobial agent is selected from a group consisting essentially of: isopropyl alcohol, ethanol, 2-propanol, butanol, methylparaben, ethylparaben, propylparaben, propyl gallate, butylated hydroxyanisole (BHA), butylated hydroxytoluene, t-butyl-hydroquinone, chloroxylenol, chlorhexidine, chlorhexidine diacetate, chlorhexidine gluconate, povidone iodine, alcohol, dichlorobenzyl alcohol, dehydroacetic acid, hexetidine, triclosan, hydrogen peroxide, colloidal silver, benzethonium chloride, benzalkonium chloride, octenidine, antibiotic, and mixtures thereof.

15. The cap of claim 14, wherein the liquid disinfectant or antimicrobial agent comprises at least one of chlorhexidine gluconate and chlorhexidine diacetate.

16. The cap of claim 1, wherein the central post is integrally-formed with the distal wall of the housing.

17. The cap of claim 5, wherein the liquid disinfectant or antimicrobial agent clings between the plurality of slits and the plurality of prongs.

18. A method of disinfecting a medical connector comprising:
   using the cap of claim 1;
   adding the disinfectant or antimicrobial agent to the cap;
   placing the cap onto a male medical connector;
   contacting a distal tip and threads of the male medical connector with the scrubbing foam and the foam jacket and the central plug of the cap;
   wherein the central plug inhibits ingress of the disinfectant or antimicrobial agent into a lumen of the male medical connector.

19. A medical assembly comprising the cap of claim 1 connected to a male medical connector having a male luer connection.

20. The cap of claim 1, wherein the foam jacket has a bottom end, a top end, an annular wall extending from the bottom end to the top end, and a peripheral ledge near the bottom end extending radially inward from the annular wall and toward the central plug.

* * * * *